Dec. 18, 1934.    J. Y. BLAZEK ET AL    1,984,627
MACHINE FOR DETECTING AND CORRECTING ERRORS IN ARTICLES
Filed April 3, 1933    4 Sheets-Sheet 3
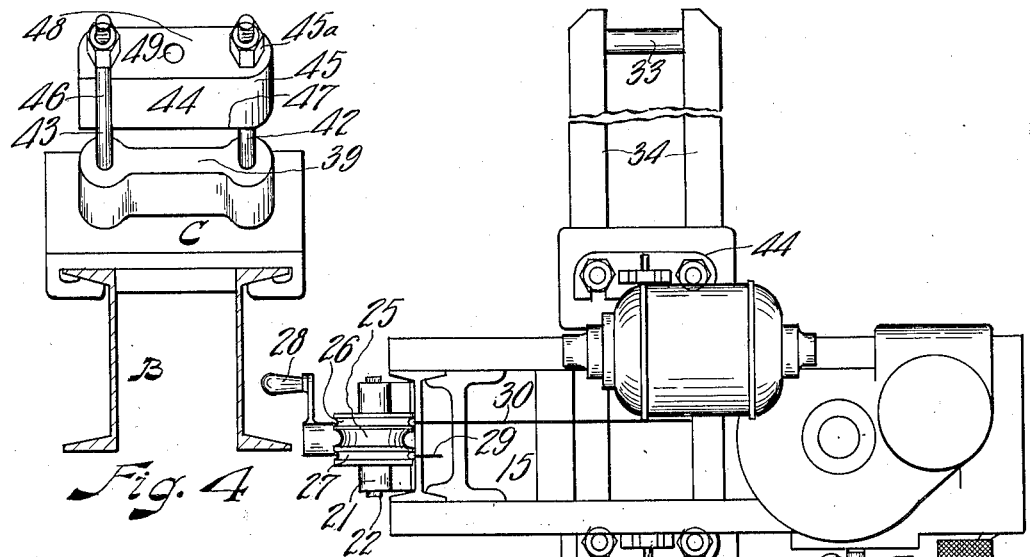
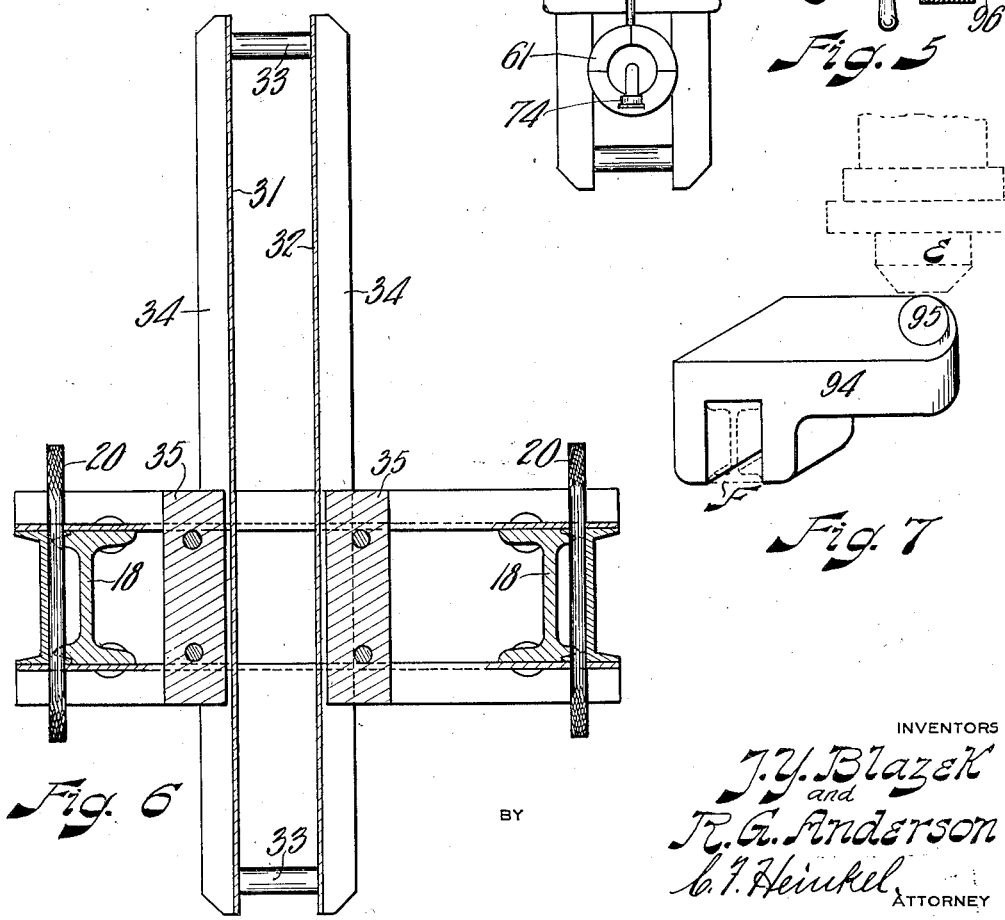
INVENTORS
J. Y. Blazek
and
R. G. Anderson
C. T. Heinkel
ATTORNEY

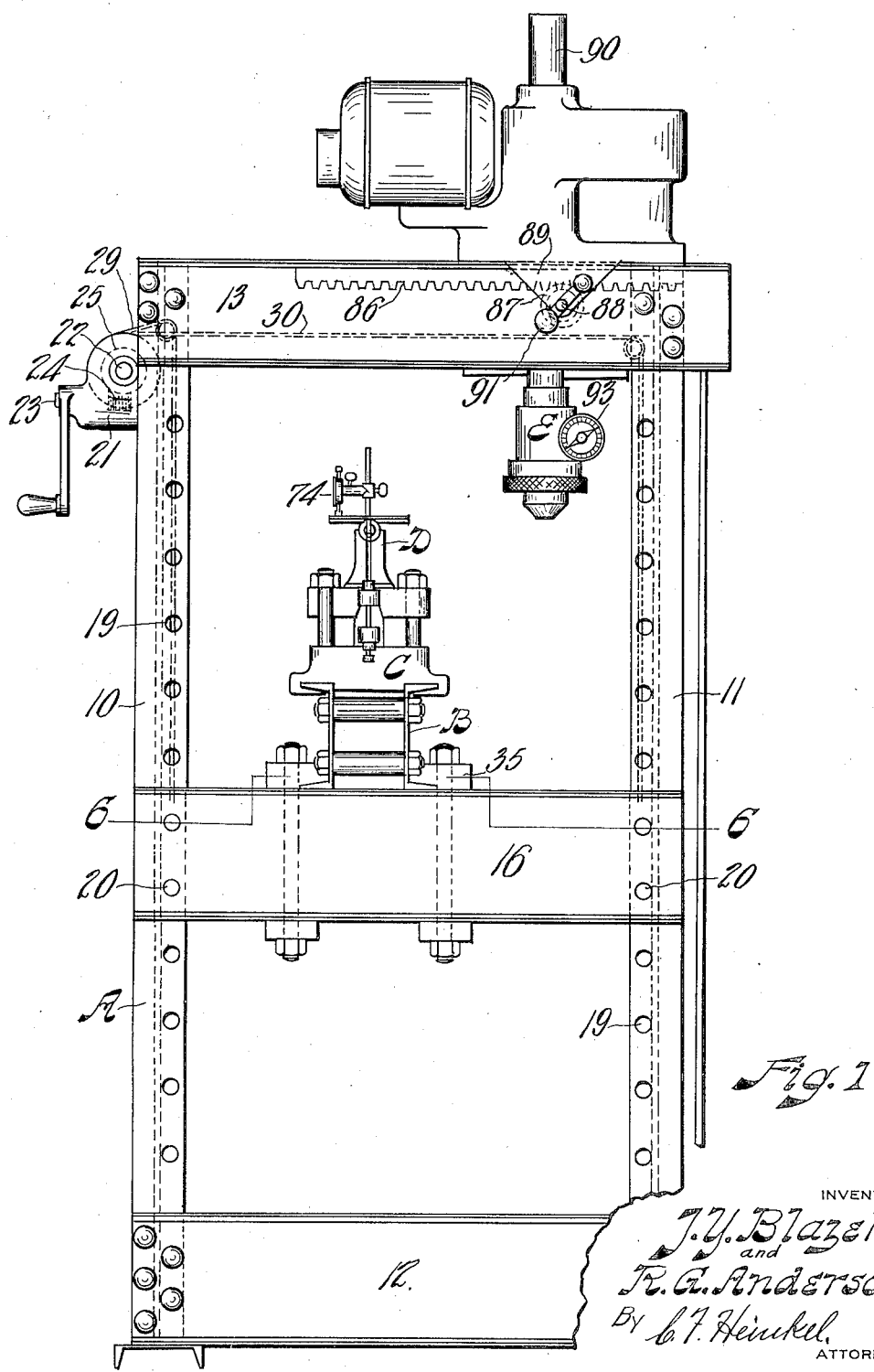

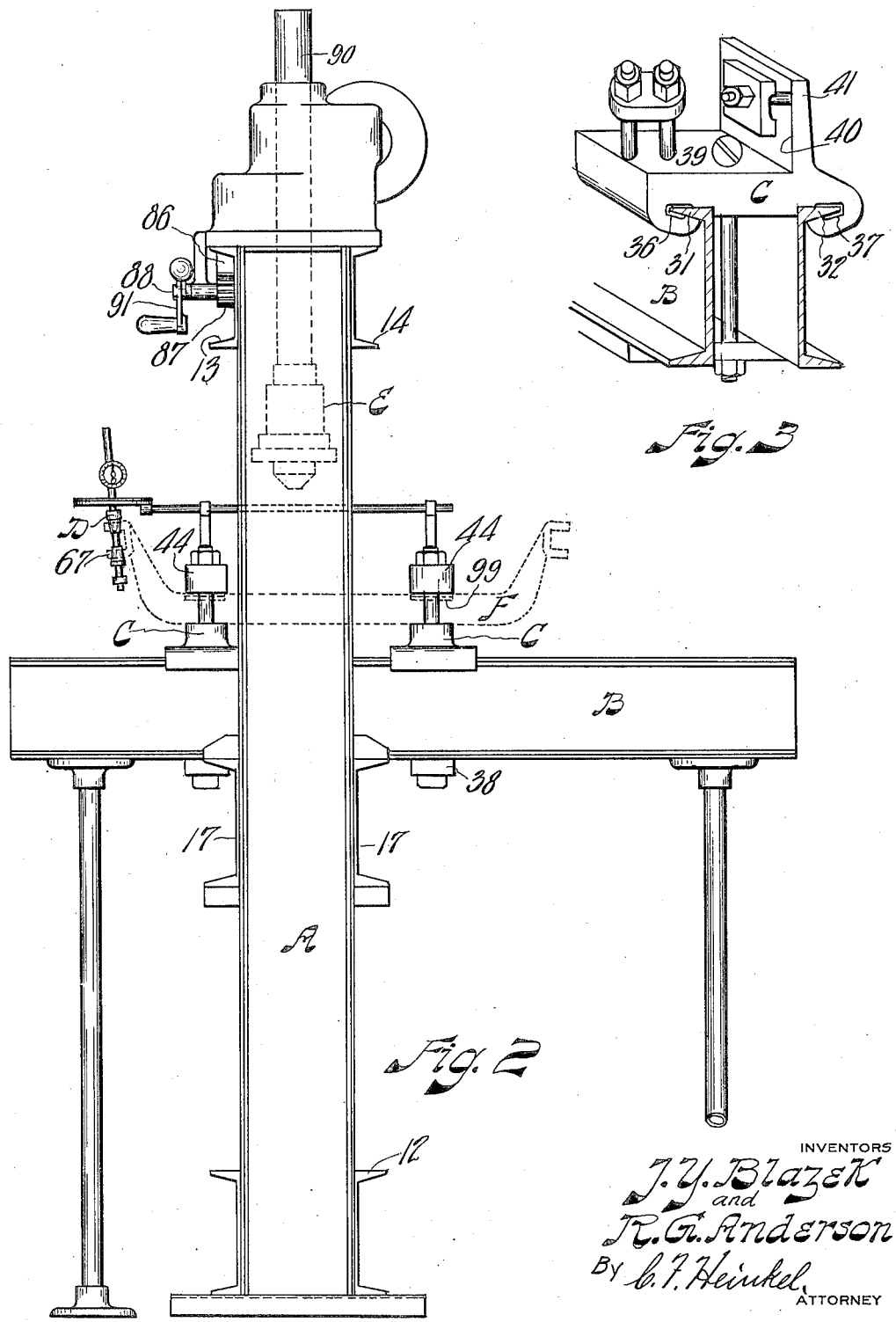

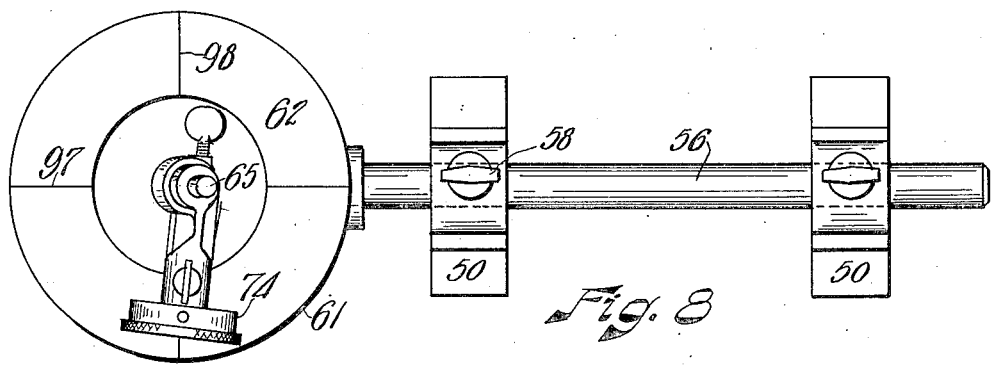
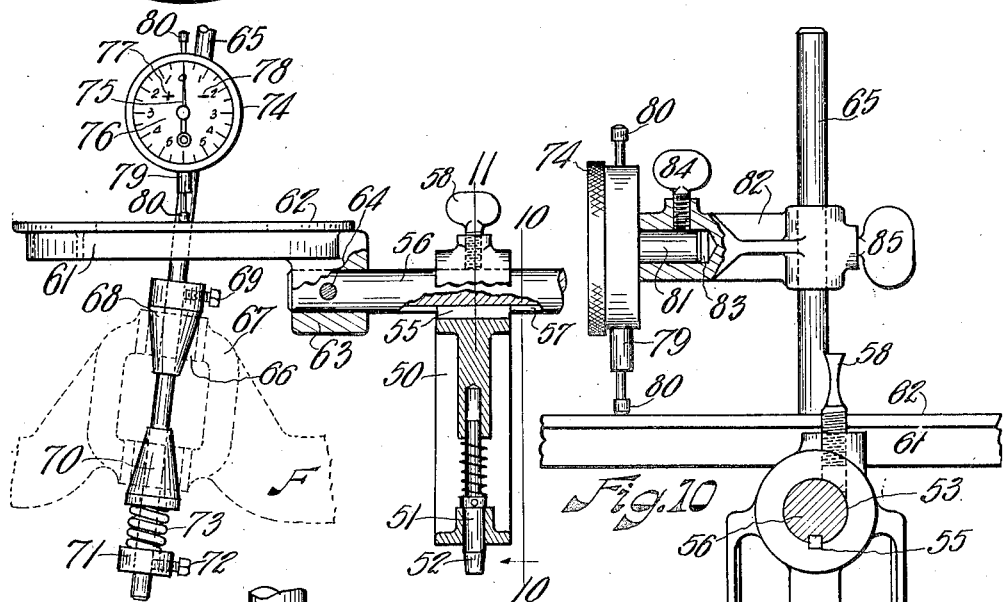
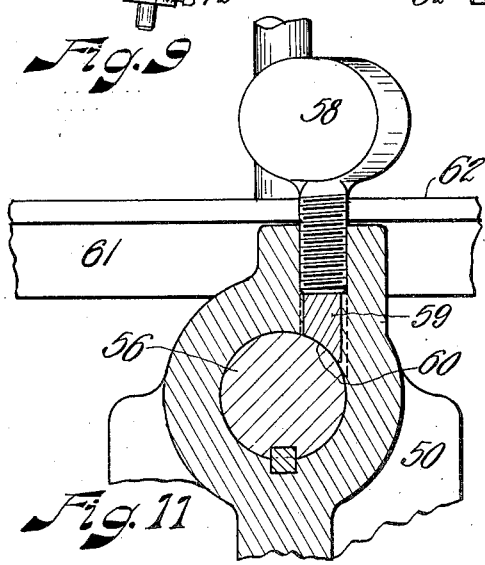

Patented Dec. 18, 1934

1,984,627

UNITED STATES PATENT OFFICE 1,984,627

MACHINE FOR DETECTING AND CORRECTING ERRORS IN ARTICLES

John Y. Blazek, Maple Heights, and Russell G. Anderson, Cleveland, Ohio, assignors to Lempco Products, Inc., Bedford, Ohio Application April 3, 1933, Serial No. 664,152

24 Claims. (Cl. 153—32)

The present invention pertains to means or devices or machines for testing articles for error therein or for correcting errors therein or for testing for and correcting errors in articles.

Errors of structure will quite frequently appear in articles either during the original formation thereof or are produced therein during machining or other operations thereon and must be corrected before the article can pass inspection as being correct.

In some instances this error may consist in incorrect relations of surfaces therein, or of holes therein, or twist or other deformations therein.

In the prior art, devices have been made to test or check articles for errors therein. Also, devices have been made to correct errors therein. However, all of the known devices are either too expensive in manufacture and in operation or in upkeep or too cumbersome and awkward in operation and use or do not test sufficiently correct; or do not correct sufficiently accurate; or are generally of low efficiency.

The present invention aims to provide a single machine which has the necessary features or mechanism thereon to detect errors in articles and to correct errors therein when found.

The objects of the present invention are to provide a simple, easily controlled, economical of upkeep, and highly efficient single machine for detecting and correcting errors in articles; to provide such a machine with an individually controlled press device to be brought into operation easily and conveniently to operate on articles for bending the same to take out twists therein and to put surfaces thereof into correct relations; to provide such a machine with an individually controlled error detecting device to be brought into operation easily and conveniently and to show where an error is located and the extent of the error; to provide such an error detecting device with a visible indicating means which shows angularity of surfaces in degrees of a circle; to provide such a machine with a longitudinally horizontally adjustable table so that any longitudinal portion of an article thereon can be brought to the ram of the press device for operation on that portion by the press device; to provide such a machine with a table supporting means which is adjustable vertically so that the table can be adjusted vertically to bring differently sized articles up to the ram of the press device; to provide such a machine with article locating adapters to engage different kinds of articles and to locate the same on the table and to make these adapters individually adjustable longitudinally of the table to engage different portions of articles longitudinally thereof; to provide a standardized receiving surface on the adapters to receive and to correctly locate and to retain brackets of the error detecting device; to arrange the power elements so that the reaction to stresses produced thereby during operation thereof will be directed into the frame so that a comparatively light weight frame will suffice for the machine.

Other objects will be mentioned and pointed out in this specification or will become obvious or apparent upon an inspection of this specification and the accompanying drawings.

We attain our objects in the one embodiment of our invention illustratively shown in the accompanying drawings and specifically described in this specification. However, we are aware that our invention can be embodied in structures other than the one structure so shown and described.

In the accompanying drawings:

Fig. 1 is a front view of a machine, embodying our invention, designed for detecting and correcting errors in an auto steering axle and particularly in the holes for the pins for the steering knuckles on the ends thereof.

Fig. 2 is a side view of Fig. 1 showing a steering axle located on the table and the error indicating and error correcting means in a certain relation thereto.

Fig. 3 is a perspective view on a larger scale of an article holding adapter with an upstanding flange thereon.

Fig. 4 is a perspective view on a larger scale of the article holding adapter shown in Figs. 1 and 2.

Fig. 5 is a plan view of Fig. 1.

Fig. 6 is a horizontal section taken on the line 6—6 of Fig. 1.

Fig. 7 is a perspective view on a larger scale of the error correcting member as related to an axle and the press device.

Fig. 8 is a plan view on a larger scale of the error detecting and indicating device.

Fig. 9 is a side view of Fig. 8.

Fig. 10 is a vertical section taken on line 10—10 of Fig. 9.

Fig. 11 is a section on a larger scale taken on the line 11 of Fig. 9 showing the offset screw and the shoe thereunder.

Similar reference characters refer to similar parts throughout the views.

The particular machine shown in the accompanying drawings comprises principally the frame A, the table B, the article locating adapters C, the error testing device D, and the error correcting device E.

The frame A comprises the sidewise spaced vertical members or legs 10 and 11, of I beam cross-section, each having a foot member on the bottom thereof to stabilize the machine. The cross member 12 connects the bottom ends of the legs for spacing thereof and to provide rigidity in the frame.

The upper ends of the legs are connected by the sidewise spaced cross members 13 and 14 each of channel cross-section and each rigidly secured to the longitudinal outside of the legs with flanges of the cross members extending outwardly of the legs to provide the space 15 between them for purposes appearing presently hereinbelow.

The table supporting member 16 extends between the legs and the ends thereof are formed to suit the cross-sectional formation of the legs so that the member 16 can move vertically relative to the frame and the ends of the member 16 are guided in or by the legs in the movement of the member 16 relative to the legs.

The table supporting member comprises two parallel spaced parts of channel form in cross-section. The webs 17 of the parts are in sliding contact on the corresponding flanges of the legs. The spacers 18 are provided between the parts of the table supporting member to space the same correctly and are formed to suit the inside of the legs to guide the table supporting member in its movement longitudinally of the legs.

The flanges of the channel formed parts extend outwardly of the legs so that the webs thereof overlap the flange parts of the legs.

The flanges of the legs each has a row of anchoring holes 19 through the same; the holes in one flange being spaced horizontally opposite the holes in the opposite flange of the legs. Corresponding anchoring holes are provided in the leg contacting part of the webs 17. The anchoring pins 20 are inserted into the corresponding anchoring holes through the flanges of the legs and the webs 17 to hold the table supporting member 16 in position relative to the legs. This structure affords an adjusting means of relating the table supporting member 16 and the table thereon to the machine to adapt the same for different kinds of articles to be operated upon by the machine.

The bracket 21 is secured to the leg 10 and has the shaft 22 journaled therein and also has the worm shaft 23 journaled therein at right angles to the axis of the shaft 22. The worm 24 is on the shaft 23 and meshes into the worm wheel 25 on the shaft 22. The two cable drums 26 and 27 are on the shaft 22. The worm wheel 25 and the drums 26 and 27 rotate with the shaft 22 when the shaft 23 is rotated by the handle 28 secured to the outer end thereof.

The cable 29 has one end thereof secured to the drum 26 and has a part thereof wound onto the same and the other end thereof secured to one end of the table supporting member 16 and passes over suitable idlers to properly relate the cable for moving the member 16.

The cable 30 has one end thereof secured to the drum 27 and has a part thereof wound thereon and the other end thereof secured to the other end of the cable supporting member 16 and passes over suitable idlers to properly relate the cable for moving the member 16.

Rotation of the worm shaft 23 by means of the handle 28 thereon rotates the worm 24 which, in turn, rotates the worm wheel 25 to rotate the shaft 22 and the cable drums thereon and thereby winds the cables onto or from the drums and moves the table supporting member up and down according to the direction of rotation of the handle 28. After the member 16 is moved into a vertically desired position, the anchoring pins are inserted and the member 16 is then securely held against vertical movement in the machine.

The table B comprises the two parallel adjacent sidewise spaced members 31 and 32, of channel form cross-sectionally, the flanges of each member extending outwardly so that the inner surface of the webs thereof define a parallel space between them. Spacing members 33 are provided to tie the members 31 and 32 together and to form a rigid table structure.

The outwardly extending flanges 34 of the members 31 and 32 form increased area support surface for the hereinbelow described adapters. The outwardly extending flanges of the parts of the table supporting member 16 also provide increased area support surface for the table on the table supporting member 16.

The clamping devices 35 engage the table B and the table supporting member 16 and afford a securing means between the table B and the supporting member 16 to retain the table in any longitudinally adjusted position thereof on the member 16. Loosening of the clamping means 35 releases the table from the member 16 to permit longitudinal adjustment thereof relative to the member 16 and to the machine as a whole and tightening of the clamping means 35, after longitudinal adjustment of the table B is made, secures the table B firmly to the member 16. The longitudinal adjustment of the table B is provided for the purpose of bringing any part longitudinally of the axle F into desired relation to other elements of the machine.

The table B is also adjustable transversely thereof and longitudinally relative to the table supporting member 16 and between the legs 10 and 11 and the clamping means 35 can be moved along the member 16 to clamp the table B onto the member 16 in any laterally adjusted position of the table B between the legs 10 and 11.

With the clamping means 35 arranged as described, the table B can be adjusted longitudinally thereof or transversely of the frame A and can also be adjusted transversely thereof or sidewise between the legs 10 and 11 and clamped in any of the adjusted positions thereof. This clamping means has the further advantage of securing the table B either in longitudinal or in transverse or in longitudinal and in transverse adjustment relative to the frame A and to render the table B universally adjustable relative to the frame A and the mechanism thereon.

Each of the clamping members of the clamping elements 35 acts independently of other clamping members so that the table B can also be adjusted for angularly inclined relation thereof to the supporting member 16 and to other parts of the machine. The adjustments of the table B mentioned above, are all attained in a horizontal plane. Shims (not shown) may be provided between the bottom of the table B and the top of the member 16 to provide angular relation of the top of the table B and the general horizontal plane mentioned.

The article locating adapters C shown in different formations in Figs. 3 and 4 each has the slots 36 and 37 in the lower end thereof for the top flanges of the members 31 and 32 to extend through. The adapters rest on the tops of the flanges. A clamping means 38 may be provided to clamp each adapter onto the top of the table B although such clamping means is not absolutely necessary.

Each adapter has an article locating surface thereon which may be the horizontal surface 39 shown in Fig. 4 or the vertical surface 40 on the upstanding part 41 shown in Fig. 3. Two upstanding studs 42 and 43 are secured in the body part of each adapter and are parallel with each other. The bar 44 has the hole 45 through one end thereof and the sidewise open slot 46 through the other end thereof. The hole and the slot fit closely to the studs respectively so that the bar can slide up and down thereon with as little as possible lost motion to keep the contact surface 47 thereon as nearly as possible in parallel planes as the bar is moved up and down relative to the studs.

The surface 48 of the bar is parallel with the surface 47 and has the dowel pin hole 49 therein.

The object of the surfaces 47 and 48 being parallel and the bar fitting closely to the studs 42 and 43 is to provide a means whereby the bar can locate an article on the table B by a part or surface thereof which is to be used for checking purposes and to locate the below described article checking mechanism relative to the part or surface which is to be used for checking. The nuts 45a are threaded onto the upper ends of the respective studs to move the bar on the studs and to clamp the article onto the adapter through the bar.

The error testing device D comprises principally one part to be located on the adapter and another part to be located by a surface of the article to be tested or checked for error.

The standards 50 (two being used in the present instance) each has the dowel pin 51 extending from the bottom thereof to engage in the hole 49 to locate the standard relative to the adapter. It is preferred that the dowel pin 51 is resiliently mounted as seen in Fig. 10 so that the nose 52 thereof will always seat itself firmly in the dowel hole 49.

The upper part of the standard has the bore 53 through the same parallel with the bottom surface 54 of the standard. The key 55 projects into the bore 53.

The stem 56 fits closely to the bore 53 and has the keyway 57 therein to engage the projecting part of the key 55 to prevent rotation of the stem in the bore. The screws 58 are tapped into the standard at one side of the longitudinal axis of the bore 53. The shoe 59 is introduced at the end of the screw 58 and has the bevel face 60 to bear sidewise against the stem 56 to securely hold the standard and the stem together.

The disk 61 has the upper gaging surface 62 thereof flat or planar and also has the boss 63 depending from a side thereof. The boss 63 has a bore therein parallel with the plane of the surface 62 and fitting to the end of the stem 56. The dowel pin 64 extends through the boss 63 and through the stem 56 in such a manner or relation that the surface 62 is held parallel with the bottom surface 54 of the standard. When it is desired to provide angular relation between the surface 62 and the bottom surface of the standard, the dowel pin 64 may be made removable and a clamping means similar to the screw 58 may be provided so that the disk can be rotated about the axis of the stem 56 for adjustment of the surface 62 thereof angular with the bottom surface 54 of the standard.

The stem 65 of the error indicating part extends through a central hole in the disk 61 and above and below the surface 62 thereof, and, in this instance, is intended to extend through the holes 66 provided in the axle F for pins supporting steering knuckles in the end 67 of the front or steering axle F.

The conical or tapered locating plug 68 is mounted on the stem 65 to engage the upper part of the hole 66 and, in this instance, is held in longitudinal position and unrotatable on the stem 65 by the set screw 69. When it is desired to have the stem 65 rotatable in the plug 68, the set screw 69 may be eliminated but a shoulder should then be provided on the stem 65 to confine the plug 68 longitudinally of the stem.

The conical or tapered locating plug 70 is mounted rotatably and movable longitudinally on the lower part of the stem 65 to engage the lower part of the hole 66. The collar 71 with the set screw 72 tapped thereinto and abutting the stem 65 is mounted on the stem below the plug 70. The spring 73 is telescoped over the stem and abuts the plug 70 and the collar 71 to normally retain both of the plugs in the holes 66 and thereby centralize the stem 65 in the hole 66.

The error indicating instrument 74 has the pointer 75 rotatable to travel over the dial 76 which has the zero mark 0 thereon and division marks on each side of the zero mark reading in degrees of a circle; the division marks on one side of the zero mark being designated by the usual cross 77 and the marks on the other side of the zero mark being designated at the usual horizontal line 78. The object of this marking is to clearly distinguish the reading on each side of the zero mark.

The shaft 79 extends through the instrument as usual and is in operative connection with the pointer 75 to rotate the same as usual. The ends of the shaft 79 have the usual feet 80 thereon so that either foot may contact a surface. The stub 81 projects outwardly of the rear end of the instrument.

The arm 82 has one end thereof formed with the bore 83 to receive the stub 81 and the set screw 84 tapped thereinto to abut the stub. The object of this structure is to provide for rotation of the instrument relative to the arm so that the same can be set or adjusted to bring the pointer 75 to the zero mark under various conditions of checking or testing.

The other end of the arm 82 has a bore therein fitting closely to the stem 65 but movable thereon longitudinally thereof so that the instrument can be adjusted vertically so that a foot thereof is in contact with the surface 62 and the pointer 75 registers zero. The set screw 85 is threaded into the other end of the arm and abuts the stem 65 for securing the arm and the instrument thereon in adjusted position on the stem 65.

The error correcting device E is mounted on the top of the cross member composed of the members 13 and 14.

The gear rack 86 is secured to the top cross member. The pinion 87 meshes into the rack and is mounted on the shaft 88 journaled in a part of the carriage 89 which is movable on the top of the top member and carries mechanism to operate the ram 90 of the error correcting device. The handle 91 is secured to and rotatable with the shaft 88 so that the carriage and the ram can manually be moved into various positions longitudinally of the top member to bring the ram into a desired position relative to the article to be tested.

The mechanism carried by the carriage 89 may be electric, pneumatic, hydraulic or of any other nature operating to move the ram 90 axially or longitudinally for operation on and return from the article to be tested. A part of the carriage extends down in between the members 13 and 14 and a little below the bottoms thereof to guide the ram in its vertical movement as far as possible. The pressure indication device 93 may be provided to show the extent of the force applied to the article during correction and thereby indicate at least approximately as to how much correction is being made by the ram.

The twisting bar 94 has one end thereof formed to engage sides of an article to be tested and the other end thereof has the surface 95 to be contacted by the ram to produce a twisting stress in the bar and thereby twist the article.

The foot pad 96 operates the control means for the error correcting means so that an operator can release the ram instantly at will.

The surface 62 has the line 97 thereon parallel with the axis of the stem 56 and also has the line 98 at right angles to the axis of the line 97.

Operation of the machine shown and described:

The steering axle F is mounted on the table B and is to be tested and corrected for errors in the hole 66 in the end 67 thereof. The adapters C are adjusted so that the bars 44 contact the spring pads 99 so that the top surface of the pads is each parallel with the top surface of the respective top surfaces of the bars 44. This setting up provides means to check the relation of the holes 66 and the spring pads 99.

The standards 50 are then set onto the respective bars 44 and are located thereon by the dowel pins therein. The standards have the axes of the dowel pins in alinement with the axes of the standards so that the standards can swivel on the bars 44 to aline the holes therein for reception of the stem 56. The stem 56 with the disk 61 thereon is then inserted into the bores in the standards; the key 55 engaging the keyway 57 to retain the surface 62 parallel with the bars 44 and the top of the spring pads 99.

The stem 65 and the conical plugs 68 and 70 are then brought into engagement with the inner surface of the holes 66 whereby the stem 65 will be centralized in the holes 66.

The error indicating instrument is mounted on the upper end of the stem 65 and may rotate thereon or therewith, if the stem is rotatable in the holes 66, about the axis of the stem 65. If it is desired to first test the sidewise relation of the holes 66 to the spring pad, the indicating instrument is rotated about the axis of the stem 65 so that the foot 80 contacts the surface 62 on the line 97 thereon. The instrument is then adjusted by rotation or vertical adjustment thereof until the pointer thereon points to zero and the adjustments are then tightened lightly.

The instrument is then rotated toward the right and toward the left until the foot is opposite the line 98 at each side. If the instrument registers the same number of degrees on each side of the zero mark as the instrument is so rotated, the axis of the holes 66 is square with the surface of the spring pad.

If the reading is not the same, a twist is given the axle by means of the twisting bar operated by ram of the error correcting device. The instrument is then re-set to zero as in the first instance and the testing or checking repeated as before. A number of twists and tests may be necessary before the axis of the hole 66 is square with the surface of the spring pad.

Usually, the axes of the holes 66 are angularly inclined relative to each other and to a perpendicular axis of the spring pads longitudinally of the axle.

To test or check this angularity, the instrument is first adjusted so that the pointer registers zero when the foot thereof contacts the line 98. A rotative movement of the instrument then from the line 98 to the line 97 on both sides will show the degree of angularity. If the instrument reads three degrees when the foot contacts the line 97 on one side and also reads three degrees when the foot contacts the line 97 on the other side, the axis of the holes inclines to the perpendicular axes of the spring pads at an angle of three degrees.

If this angularity is not correct, the table and the error correction device can be moved to bring the ram thereof vertically opposite the end of the axle. An operation of the ram on this end will bend the axle and decrease the angularity. An adjustment of the table and the error correcting device will bring the ram vertically opposite a part of the axle inside of the adapter at that end. An operation of the ram on the axle will bend the same so that the angularity of the axis of the holes 66 relative to a perpendicular axis of the spring pad will be increased thereby.

For straightening or otherwise bending the axle F or any other article, the table B and the error correcting device are moved to bring the ram vertically opposite the part of the article which needs bending and operate the ram for bending.

The axle or other articles can be held by the adapters either vertically or sidewise and bent accordingly.

The error indicating or testing device can be exchangeably installed at each end of the axle. Also the stem 56 can be lengthened and a disk 61 attached to each end thereof for testing both ends of the article at the same time and relative to each other. The examples of setting the error indicating instrument given above appear to be sufficient to clearly show how the two instruments on the respective ends of the stem 56 can be adjusted for relative testing of the ends combined with the testing relative to the spring pads.

The machine specifically shown and described in this application has means to test articles for error therein and to correct errors as found by the testing means or otherwise so that the machine can be used for testing articles without correcting them by omitting the correcting means.

The machine can also be used for correction of error without testing by omitting the testing means.

The machine can also be used for testing and correcting of errors when it is made as shown and described.

We are aware that the principle of our invention is applicable to machines or devices other than the one shown and described in this application and that changes and modifications of parts and arrangements thereof can be made in the machine shown and described herein within the spirit and intent of the present invention and the appended claims.

Therefore, without limiting ourselves to the precise application of our invention as shown and described nor to the precise structure and arrangements of the parts as shown and described,

We claim:

1. A frame, a table supported on said frame, article locating adapters on said table, a press device for correcting errors in an article supported on said frame, and a testing device for detecting errors in the article supported partly on said adapters and partly on the article which is to be tested.

2. A frame, a table supported on said frame, article locating adapters on said table, a press device for correcting errors in an article supported on said frame, and a testing device for detecting errors in the article supported partly on said adapters and partly on the article which is to be tested; said table being longitudinally adjustable relative to said frame to selectively present different portions of the article for operation thereon by said press device longitudinally of the article.

3. A frame, a table longitudinally adjustably supported on said frame, article locating adapters on said table, a press device for correcting errors in an article supported on said frame, and a testing device for detecting errors in the article supported partly on said locating adapters and partly on the article which is to be tested; said press device being adjustable transversely of the adjustment of said table to bring the ram thereof into different positions to selectively operate on different portions transversely of the article.

4. A frame, a table supported on said frame, article locating adapters on said table, a press device for correction of errors in an article supported on said frame, and a testing device for detecting errors in the article supported partly on said adapters and partly on the article which is to be tested; said table being longitudinally adjustable relative to said frame to selectively present different portions of the article for operation thereon by said press device longitudinally of the article; said press device being adjustable transversely of the adjustment of said table to bring the ram thereof into different positions to selectively operate on different portions transversely of the article.

5. A frame, a table supported on said frame, article locating adapters on said table, a press device for correction of error in an article supported on said frame, and a testing device for detecting error in the article supported partly on said adapters and partly on the article which is to be tested; said testing device including a gaging surface bearing a definite planar relation to an article locating surface on said adapters and an indicator device having an operating shaft for contact on said gaging surface and operated by change of position of said shaft on said gaging surface.

6. A frame, a table supported on said frame, article locating adapters on said table, a press device for correction of error in an article supported on said adapters, and a testing device for detecting error in the article supported partly by said adapters and partly on the article which is to be tested; said testing device including a gaging surface bearing a definite planar relation to an article locating surface on said adapters, a stem supported by the surface of the article to be tested, and an indicator instrument on said stem and having an operating shaft for contact on said gaging surface and operated by change of position of said shaft on said gaging surface.

7. A frame, a table supported on said frame, article locating adapters on said table, a press device for correction of error in an article supported on said adapters, and a testing device for detecting error in the article supported partly by said adapters and partly on the article which is to be tested; said testing device including a gaging surface bearing a definite planar relation to an article locating surface on said adapters, a stem supported by the surface of the article to be tested, an indicator instrument on said stem and having an operating shaft for contact on said gaging surface and operated by change of position of said shaft on said gaging surface, a pointer in operative connection with said shaft, and a dial adjacent to said pointer and having lines thereon reading on degrees of a circle.

8. An article testing and correcting device including article testing mechanism, article correcting mechanism, and an error indicating instrument operated by rotating the same about an axis extraneous of the instrument during the testing of the article, said instrument comprising a casing, a pointer therein, a dial therein adjacent to said pointer, and said dial having graduation lines thereon spaced according to standard division of a circle into 360 degrees to test errors in terms of angularity.

9. A frame, a table supported on said frame, article locating adapters on said table, a press device for correction of error in an article supported by said frame, and a testing device for detecting error in the article supported partly on said adapters and partly on the article which is to be tested; said adapters being adjustable on said table to accommodate variously sized articles and to be shifted to meet surface intended to be used as a basis for the testing of the article.

10. An adapter for an article, a locating surface on said adapter and definitely related to a part of the article, a device for indicating errors in the article on said surface to locate said device in one direction, and a dowel means between said adapter and said device to locate said device in other directions.

11. An adapter for an article having a surface definitely related to a part of an article in the adapter, and a device for indicating error in the article located by said locating means and comprising a bracket located by said surface, a stem unrotatable in said bracket, a disk unrotatable on said stem, and an error indicating instrument supported by a part of the article which part is to be tested and adapted to be moved into different positions relative to said disk and having an operating shaft to contact said disk for operation of said instrument.

12. An error indicating device comprising a stem adapted to be held in a definite relation to a portion of an article to be tested, and an error indicating part adapted to be held on said stem in a definite relation to another portion of the article to be tested and operated by relative movement between said error indicating part and said other portion of the article.

13. An error indicating device including a disk supported in a definite relation to an article to be tested, a check line on said disk parallel with the axis of the article, a check line on said disk at right angles to the firstly mentioned line, and a dialed indicator having an operating shaft in contact with said disk and thereby indicating errors in the article upon relative movement between said disk and said shaft with respect to said lines on said disk.

14. An article testing and correcting machine including a direct reading article testing device and an article correcting device and an individual bar having means thereon to telescope transversely over and engage sides of an article and a part spaced from said means to be acted upon by said article correcting device to exert a twisting stress on that part of the article which is engaged by said bar.

15. An article testing device including a bracket locatable relative to an article to be tested, a stem unrotatable in said bracket but longitudinally adjustable therein, a disk on said stem, the plane of the face of said disk being parallel with the axis of said stem, said disk being rotatable about said axis of said stem, a stem alined with a surface on the article to be tested and extending through said disk, and an error indicating device rotatable relative to said disk and in error detecting relation thereto.

16. A disk supported in relation to an article to be tested, a stem secured to and alined with a part which is to be tested and extending through and upwardly of said disk and free of contact therewith, and an indicator instrument removably on the upper part of said stem and having the operating shaft thereof in contact with the upper surface of said disk.

17. A disk supported to aline a surface thereof with an axis of an article to be tested, a stem supported by a part of the article which part is to be tested relative to said axis and free of contact on said disk, and an indicator instrument on said stem and having the operating shaft thereof in contact with said surface to be operated thereby upon contact of said shaft on different parts of said surface upon rotation of said indicator instrument about the axis of said stem.

18. A machine for correcting errors in articles comprising a frame, article supporting means on said frame, and a power driven, pressure indicating press device for correcting errors supported on the top of said frame to leave the sides of the machine unobstructed thereby; said press device being movable on said top so that the same can be brought into operative position relative to an article on said article supporting means.

19. A machine for correcting errors in articles comprising a frame, article supporting means on said frame, and a press device for correcting errors supported on the top of said frame to leave the sides of the machine unobstructed thereby; said press device being movable on said top so that the same can be brought into operative position relative to an article on said article supporting means, and a moving means for said press device comprising a rack positionally fixed and a manually operated pinion on said press device engaging said rack to move said press device.

20. A machine for correcting errors in articles comprising a frame, article supporting means on said frame, and a power driven, pressure indicating press device for correcting errors supported on the top of said frame to leave the sides of said frame unobstructed thereby; said press device being movable on said top so that the same can be brought into operative position relative to an article on said article supporting means and a moving means for said press device comprising relatively movable parts, one of said parts being mounted on said frame and the other one of said parts being mounted on said press device.

21. An error testing means comprising a member having a disk adapted to aline itself according to a surface of an article upon attachment of said member to the article, a stem adapted to centralize itself in a hole in the article, and an instrument between said disk and said stem to show error between said surface and said hole.

22. A machine for detecting and correcting errors in articles comprising a frame, article supporting means on said frame, an error testing means comprising a member having a disk adapted to aline itself according to a surface of the article upon attachment of said member to the article, a stem adapted to aline itself according to another surface of the article upon attachment of the stem to the article, and an error indicating instrument carried by said stem and operated by said disk upon rotation of said instrument about the axis of said stem, and a press device mounted on the top of said frame for correcting errors found by said testing means.

23. An article testing device including a stem centralized on that part of the article which is to be tested, an error indication instrument supported on said stem and having an operating foot thereon and a dial with a zero mark thereon and graduation marks reading progressively toward the right of the zero mark and progressively toward the left of the zero mark, and a disc located by that surface of the article which forms the basis for the testing and located to be contacted by said foot to operate said instrument.

24. An article testing device including a member to locate the article by that face thereon which is to form the basis for testing, a disc carried by said member, the plane of the surface of said disc being parallel with the article locating face on said member, a stem centralized in that part of the article which is to be tested, and an error indicating instrument on said stem and having a foot for contact on said disc to operate said instrument upon rotative movement thereof about the axis of said stem.

JOHN Y. BLAZEK.
RUSSELL G. ANDERSON.